United States Patent
Hyde et al.

(10) Patent No.: US 8,160,501 B1
(45) Date of Patent: Apr. 17, 2012

(54) TEST DEVICE FOR GAIN LEVEL DETERMINATION OF WIRELESS REPEATER SYSTEMS

(75) Inventors: Caleb S. Hyde, Overland Park, KS (US); Andrew Mark Wurtenberger, Olathe, KS (US); Bryan Timothy Barbee, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 620 days.

(21) Appl. No.: 12/401,407

(22) Filed: Mar. 10, 2009

(51) Int. Cl.
*H04B 7/15* (2006.01)

(52) U.S. Cl. .................. 455/67.14; 455/67.11; 455/9

(58) Field of Classification Search .............. 455/7, 9, 455/10, 67.11, 67.14, 69, 522
See application file for complete search history.

(56) References Cited

U.S. PATENT DOCUMENTS

| | | | |
|---|---|---|---|
| 6,253,060 B1 * | 6/2001 | Komara et al. .................. 455/9 |
| 6,289,216 B1 | 9/2001 | Koh et al. | |
| 7,171,157 B2 * | 1/2007 | Lee ................................. 455/8 |
| 7,218,275 B2 | 5/2007 | Han | |
| 7,262,731 B2 | 8/2007 | Han | |
| 7,391,386 B2 | 6/2008 | Sawaya et al. | |
| 7,526,247 B2 * | 4/2009 | Baker et al. .................. 455/11.1 |
| 2005/0085267 A1 | 4/2005 | Lemson et al. | |
| 2005/0213965 A1 * | 9/2005 | Bergmann et al. .............. 398/16 |
| 2006/0205355 A1 | 9/2006 | Laroia et al. | |
| 2006/0205356 A1 | 9/2006 | Laroia et al. | |
| 2006/0232492 A1 | 10/2006 | Sawatani | |
| 2008/0039012 A1 | 2/2008 | McKay et al. | |

\* cited by examiner

*Primary Examiner* — Dinh T. Le

(57) ABSTRACT

What is disclosed is a test device for a wireless repeater system in a wireless communication network. The test device includes a transmitter configured to establish a call with the wireless communication network through the wireless repeater system and determine a number of probes required to establish the call. The test device also includes a receiver configured to receive the call from the wireless communication network through the wireless repeater system and determine a signal strength of the received call. The test device also includes a control processor configured to process the number of probes required to establish the call and the signal strength of the received call to determine a gain level for the wireless repeater system. The test device also includes a control interface configured to transfer the gain level to the wireless repeater system.

20 Claims, 7 Drawing Sheets

TEST DEVICE FOR GAIN LEVEL DETERMINATION OF WIRELESS REPEATER SYSTEMS

TECHNICAL FIELD

Aspects of the disclosure are related to the field of communications, and in particular, a test device for gain level determination of wireless repeater systems in wireless communication networks.

TECHNICAL BACKGROUND

Wireless communication networks typically include wireless access nodes through which wireless communication devices communicate. Many times, the wireless communication devices are mobile, and move throughout areas of poor wireless communication coverage. In other examples, the wireless communication devices are located within buildings or other structures which can degrade wireless communications between the wireless communication devices and the wireless access nodes.

Wireless repeaters can be employed to enhance the wireless communication coverage of wireless access nodes for wireless communication devices. The wireless repeaters often retransmit the wireless communications of wireless access nodes for better reception by wireless communication devices. Likewise, the wireless repeaters can also retransmit the wireless communications of the wireless communication devices for better reception by wireless access nodes.

Unfortunately, it can be difficult and costly to adjust parameters of the wireless repeaters, such as a transmit gain. Many times the gain must be adjusted manually by a technician during initial installation of the wireless repeater, and the gain cannot easily be adjusted quickly to handle changing conditions of the wireless communications.

OVERVIEW

What is disclosed is a test device for a wireless repeater system in a wireless communication network. The test device includes a transmitter configured to establish a call with the wireless communication network through the wireless repeater system and determine a number of probes required to establish the call. The test device also includes a receiver configured to receive the call from the wireless communication network through the wireless repeater system and determine a signal strength of the received call. The test device also includes a control processor configured to process the number of probes required to establish the call and the signal strength of the received call to determine a gain level for the wireless repeater system. The test device also includes a control interface configured to transfer the gain level to the wireless repeater system.

What is also disclosed is a method of operating a test device for a wireless repeater system in a wireless communication network. The method includes establishing a call with the wireless communication network through the wireless repeater system and determining a number of probes required to establish the call. The method also includes receiving the call from the wireless communication network through the wireless repeater system and determining a signal strength of the received call. The method also includes processing the number of probes required to establish the call and the signal strength of the received call to determine a gain level for the wireless repeater system, and transferring the gain level to the wireless repeater system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
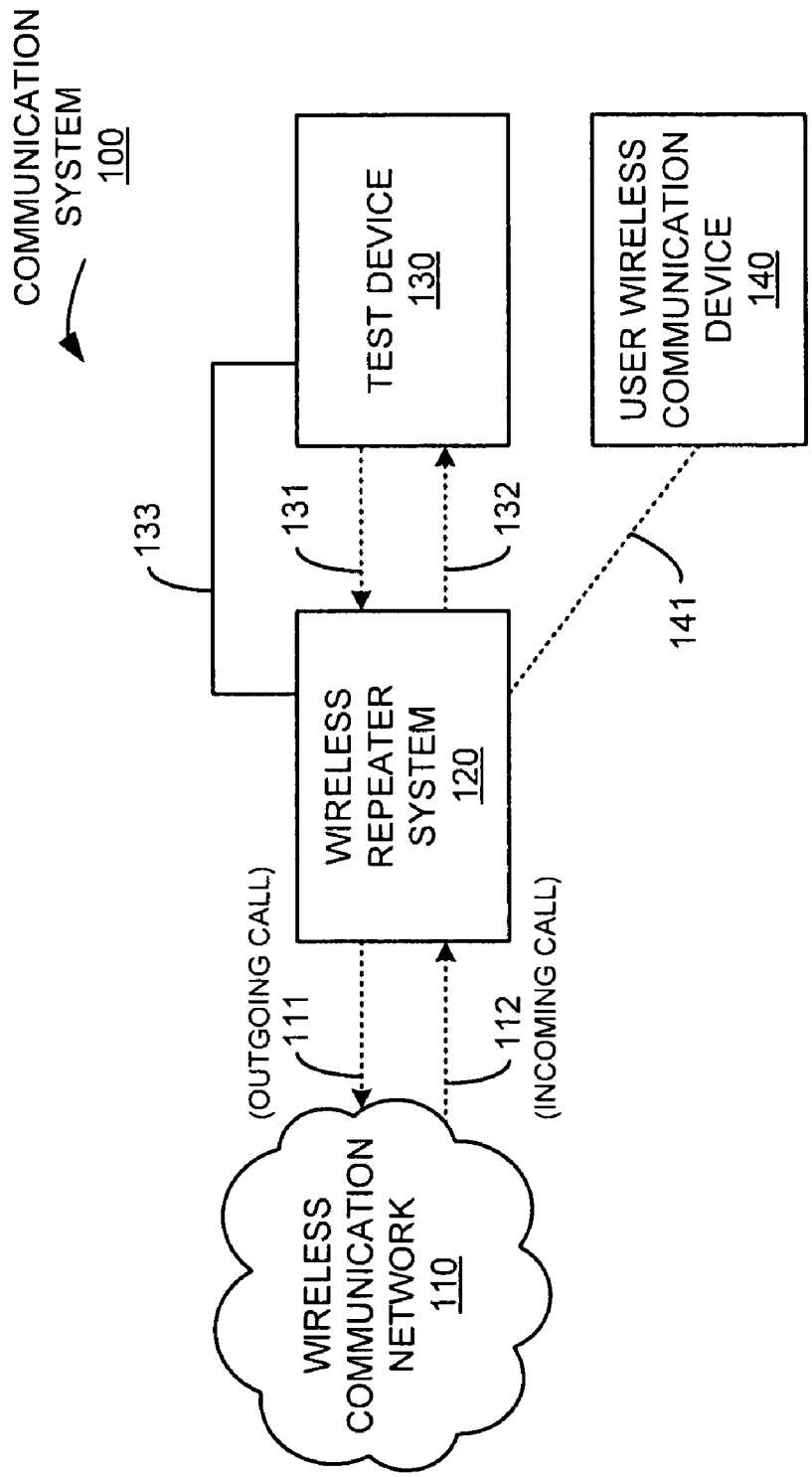
FIG. 1 is a system diagram illustrating a communication system.

FIG. 1 is a system diagram illustrating communication system 100. Communication system 100 includes wireless communication network 110, wireless repeater system 120, test device 130, and user wireless communication device 140. Wireless communication network 110 and wireless repeater system 120 communicate over wireless links 111 and 112. Wireless repeater system 120 and test device 130 communicate over wireless links 131 and 132, and over link 133. Wireless repeater system 120 and user wireless communication device 140 communicate over wireless link 141.

Wireless communication network 110 can include wireless access nodes, base transceiver stations (BTS), base stations, base station controllers, radio node controllers (RNC), packet data serving nodes (PDSN), authentication, authorization, and accounting (AAA) equipment, home agents, data centers, mobile switching centers (MSC), call processing equipment, telephone switches, Internet routers, network gateways, as well as other type of communication equipment—including combinations thereof. Some examples of wireless communication network 110 include the core network of a wireless communication system.

Wireless repeater system 120 retransmits wireless communications received from wireless links 111, 112, 131, 132, and 141. Wireless repeater system 120 includes antennas, amplifiers, control interfaces, buffers, transmitters, receivers, or other communication equipment and circuitry. Some examples of wireless repeater system 120 are found in distributed antenna systems. Wireless repeater system 120 could include multiple antennas for receiving and retransmitting. In many examples, wireless repeater system 120 has equipment to apply a gain level as received over link 133 to retransmitted communications.

Test device 130 can include transmitters, receivers, transceivers, telephones, antennas, digital assistants, smart phones, Internet appliances, network interfaces, control interfaces, wireless communication devices, reduced functionality wireless communication devices, or other communication equipment—including combinations thereof. Examples of test device 130 may also include processing equipment, computers, or software such as an operating system, logs, utilities, drivers, networking software, and other software stored on a computer-readable medium.

User wireless communication device 140 comprises a telephone, transceiver, computer, digital assistant, smart phone, Internet appliance, or some other wireless communication apparatus—including combinations thereof. Although only wireless communication device 140 is shown in FIG. 1, it should be understood that in other examples more wireless communication devices could be in communication with wireless communication network 110 through wireless repeater system 120.

Wireless links 111, 112, 131, 132, and 141 each use various communication media, such as air, space, or some other wireless transport media—including combinations thereof. Wireless links 111, 112, 131, 132, and 141 each use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format—including combinations, improvements, or variations thereof.

In the example found in FIG. 1, wireless link 131 and 111 could be for an outgoing call between test device 130 and wireless communication network 110, while wireless links 112 and 132 could be for an incoming call between test device 130 and wireless communication network 110. Also, wireless communications received over wireless link 141 are also retransmitted by wireless repeater system 120, but an additional wireless link between wireless communication network 110 and wireless repeater system 120 is not shown for clarity.

It should be understood that wireless links 111, 112, 131, 132, and 141 may each comprise many different signals sharing the same link. Wireless links 111, 112, 131, 132, and 141 could each include multiple signals operating in a single airpath—as represented by the dashed lines in FIG. 1—comprising forward links, reverse links, beacon signals, user communications, communication sessions, overhead communications, frequencies, timeslots, transportation ports, logical transportation links, network sockets, packets, or communication directions. For example, communications related to an outgoing call established by test device 130 with wireless communication network 110, through wireless repeater system 120, could share the same representative wireless links 131 and 111, but be exchanged over a forward link, reverse link, different communication sessions, frequencies, timeslots, packets, ports, sockets, logical transport links, or in different directions—including combinations thereof.

Each call established to and from test device 130 through wireless repeater system 120 with wireless communication network 110 could include bi-directional communications. For example, when wireless links 131 and 111 represent an outgoing call established by test device 130, the portions of the bi-directional wireless communications relating to the outgoing call that are transferred by test device 130 through wireless repeater system 120 to wireless communication network 110, over wireless links 131 and 111, are considered the reverse link portions. Likewise, the portions of the bi-directional wireless communications relating to the outgoing call that are transferred by wireless communication network 110 through wireless repeater system 120 to test device 130, over wireless links 111 and 131, are considered the forward link portions.

Link 133 uses various communication media, such as air, space, metal, optical fiber, or some other signal propagation path—including combinations thereof. Link 133 could be wired or wireless and use various communication protocols such as Internet protocol (IP), local-area network (LAN), optical networking, hybrid fiber coax (HFC), or some other communication format, including combinations or variations thereof. Link 133 could be a direct link or might include various equipment, intermediate components, systems, and networks. Link 133 could include multiple signals operating in a single pathway in a similar manner as links 111, 112, 131, 132, and 141 or incorporate wireless protocols as described for links 111, 112, 131, 132, and 141.

Figure 2:
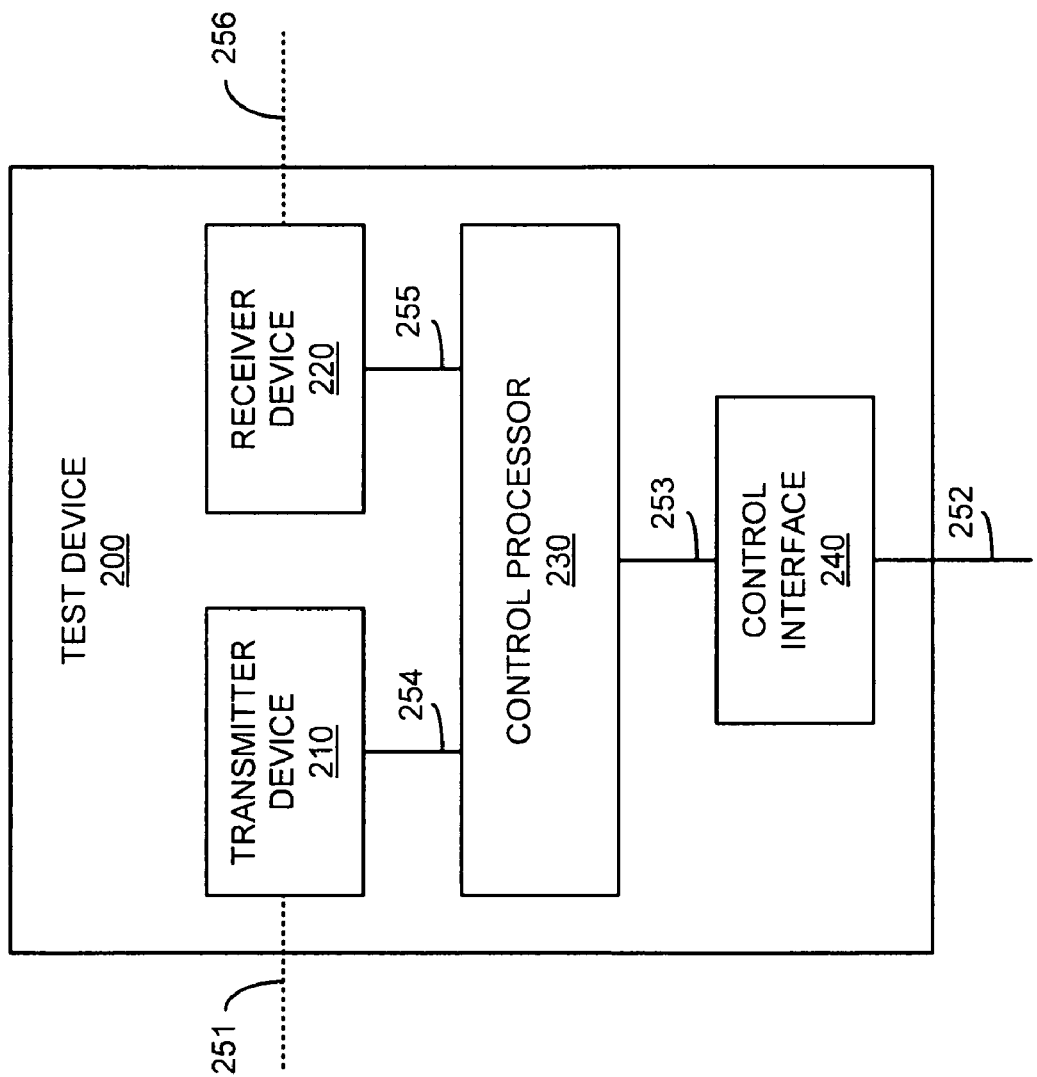
FIG. 2 is a block diagram illustrating a test device.

FIG. 2 is a block diagram illustrating test device 200, as an example of test device 130 of FIG. 1, although test device 130 of FIG. 1 could use other configurations. Test device 200 includes transmitter device 210, receiver device 220, control processor 230, and control interface 240. Transmitter device 210 and control processor 230 communicate over link 254. Transmitter device 210 also communicates over wireless link 251. Receiver device 220 and control processor 230 communicate over link 255. Receiver device 220 also communicates over wireless link 256. Control processor 230 and control interface 240 communicate over link 253. Control interface also communicates over link 252.

Transmitter device 210 includes equipment and circuitry for establishing a call with a wireless communication network over wireless link 251. Examples of transmitter device 210 include transceiver equipment, antennas, amplifiers, signal processing circuitry, or other communications equipment. Additionally, transmitter device 210 includes equipment and circuitry to communicate with control processor 230 over link 254. Further examples of transmitter device 210 can include a wireless communication device or reduced-functionality wireless communication device.

Receiver device 220 includes equipment and circuitry for receiving a call from a wireless communication network over wireless link 256. Examples of receiver device 220 include transceiver equipment, antennas, amplifiers, signal processing circuitry, or other communications equipment. Additionally, receiver device 220 includes equipment and circuitry to communicate with control processor 230 over link 255. Further examples of receiver device 220 can include a wireless communication device or reduced-functionality wireless communication device.

Control processor 230 could incorporate a computer microprocessor, logic circuit, or some other processing device, and may be distributed among multiple processing devices. In some examples, control processor 230 is located within the same equipment in which transmitter device 210, receiver device 220, or control interface 240 are located. Control processor 230 could include a computer-readable medium such as a disk, tape, integrated circuit, server, or some other memory device, which could be distributed among multiple memory devices. Control processor 230 may include an operating system, logs, utilities, drivers, networking software, and other software typically loaded onto a computer system. Software of control processor 230 could contain an application program, firmware, or some other form of computer-readable processing instructions. Additionally, control processor 230 includes equipment and circuitry to communicate with control interface 240 over link 253.

Control interface 240 includes equipment and circuitry for transferring a gain level or other parameters to a wireless repeater system, such as wireless repeater system 120 in FIG. 1. In some examples, control interface incorporates equipment for communicating over a wired or wireless interface, such as Ethernet, serial communication, Internet protocol (IP), wireless-fidelity (WiFi), or other communication interfaces. In further examples, control interface 240 includes a wireless communication device.

Wireless links 251 and 256 each use various communication media, such as air, space, or some other wireless transport media—including combinations thereof. Wireless links 251 and 256 each use various protocols, such as code division multiple access (CDMA), worldwide interoperability for microwave access (WiMAX), universal mobile telecommunications system (UMTS), long-term evolution (LTE), wireless fidelity (WiFi), global system for mobile communications (GSM), or some other communication format, including combinations, improvements, or variations thereof.

Wireless links 251 and 256 may each comprise many different signals sharing the same link. Wireless links 251 and 256 could each include multiple signals operating in a single airpath—as represented by the dashed lines in FIG. 2—comprising forward links, reverse links, beacon signals, user communications, communication sessions, overhead communications, frequencies, timeslots, transportation ports, logical transportation links, network sockets, packets, or communication directions.

Link 252 uses various communication media, such as air, space, metal, optical fiber, or some other signal propagation path—including combinations thereof. Link 252 could be wired or wireless and use various communication protocols such as Internet protocol (IP), local-area network (LAN), optical networking, hybrid fiber coax (HFC), or some other communication format, including combinations or variations thereof. Link 252 could be a direct link or might include various equipment, intermediate components, systems, and networks. Link 252 could include multiple signals operating in a single pathway in a similar manner as links 251 and 256, or incorporate wireless protocols as described for links 251 and 256.

Links 253-255 comprise physical, logical, or virtual communication links, capable of communicating data, control signals, along with other information. In some examples, links 253-255 are encapsulated within the elements of transmitter device 210, receiver device 220, control processor 230, or control interface 240 and may be a software or logical link. Links 253-255 use various communication media, such as air, space, metal, optical fiber, or some other signal propagation path—including combinations thereof. Links 253-255 could be wired or wireless and use various communication protocols such as Internet protocol (IP), local-area network (LAN), optical networking, hybrid fiber coax (HFC), or some other communication format, including combinations or variations thereof. Links 253-255 could be direct links or might include various equipment, intermediate components, systems, and networks.

Figure 3:
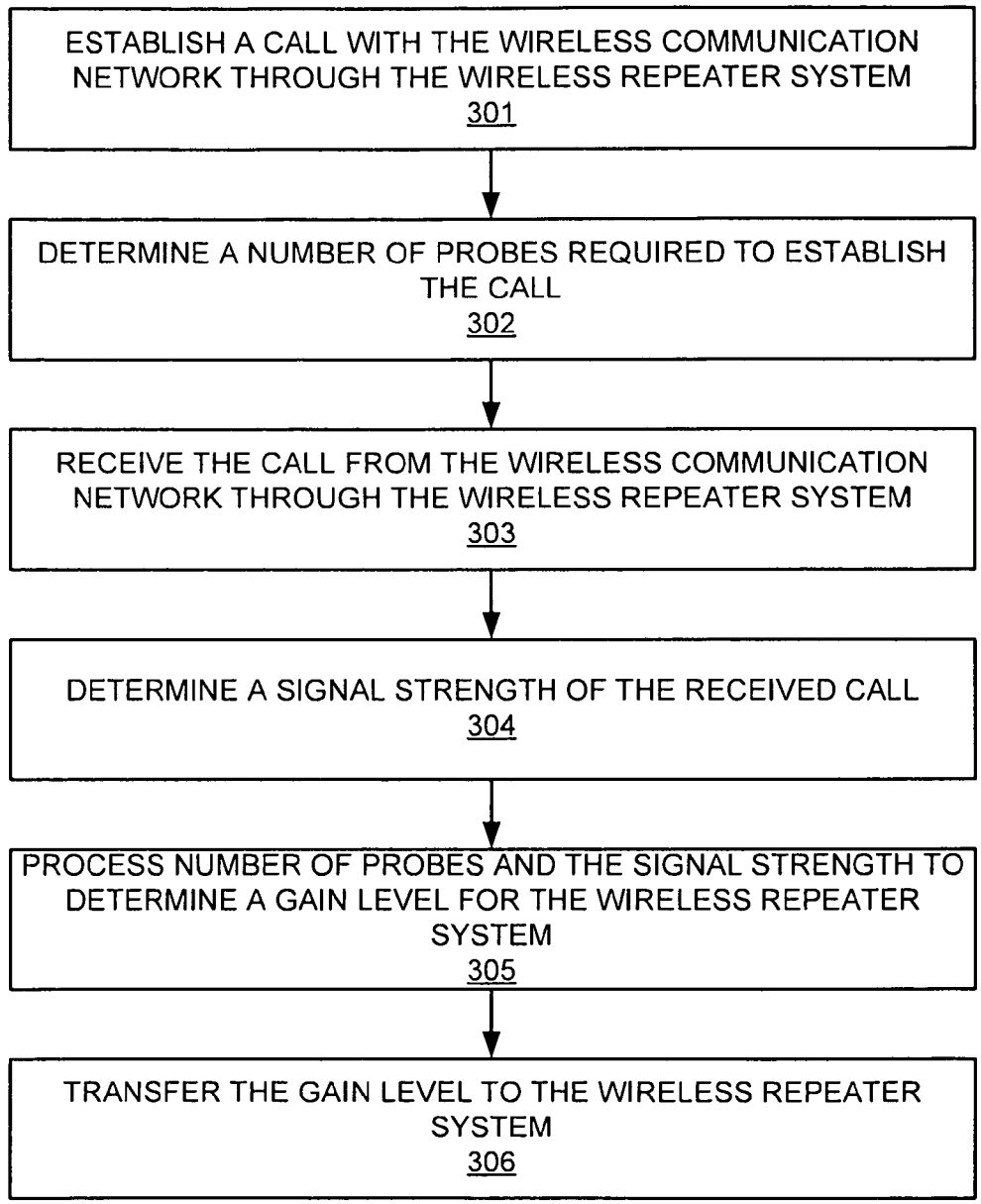
FIG. 3 is a flow diagram illustrating a method of operation of a test device.

FIG. 3 is a flow diagram illustrating a method of operation of test device 130, as found in FIG. 1. The operations shown in FIG. 3 are indicated herein parenthetically.

In FIG. 3, test device 130 establishes (301) a call with wireless communication network 110 through wireless repeater system 120. In the example shown in FIG. 1, wireless links 131 and 111 represent the outgoing call established by test device 130, which could include both forward link and reverse link portions. Wireless repeater system 120 receives the outgoing call signals from test device 130 over wireless link 131, and retransmits the outgoing call signals over wireless link 111 for receipt by wireless communication network 110. In the example of test device 200 shown in FIG. 2, the outgoing call could be established by transmitter device 210 of test device 200 over wireless link 251.

In this example, wireless repeater system 120 applies a gain level to call signals retransmitted, and wireless repeater system 120 can receive the gain level over link 133 from test device 130. This received gain level could be applied to signals retransmitted over any of wireless links 111, 112, 131, 132, or 141, but in typical examples is applied to signals retransmitted over wireless links 131, 132, and 141.

In some examples, the call established is a call to a phone number associated with test device 130. The call would be handled by wireless communication network 110. Wireless communication network 110 would then process the call, and route the call to test device 130 over wireless repeater system 120. In some examples, the call is a voice call to a phone number associated with test device 130. In other examples, the call is a data call to a phone number associated with test device 130. In examples where the call established is a call to a phone number associated with test device 130, two phone numbers could be associated with test device 130—one for outgoing calls, and one for received calls. If only one phone number was employed, test device 130 may not be able to simultaneously place a call and receive a call with itself, as wireless communication network 110 could indicate a busy condition for incoming calls to test device 130.

Test device 130 determines (302) a number of probes required to establish the call. When test device 130 attempts to establish a call with wireless communication network 110 through wireless repeater system 120 as in operation 301, a number of call attempts may be required.

These call attempts can be referred to as probes, and indicate attempts by the test device to establish a call with wireless communication network 110. In many examples, it takes several probes before a call is established with wireless communication network 110. This number of probes required can be influenced by the amount of signal noise around test device 130 or wireless communication network 110, the number and power level of other wireless communication devices communicating in the vicinity of test device 130, the loading of an access node in wireless communication network 110 through which test device is attempting to establish the call, the distance test device 130 is from wireless repeater system 120, or other factors. In some examples, the probes represent communication attempts in a CDMA protocol, which could include an increasing probe transmit power level for each subsequent probe. In the example shown in FIG. 2, transmitter device 210 or control processor 230 of test device 200 could determine the number of probes required.

Test device 130 then receives (303) the call from wireless communication network 110 through wireless repeater system 120. In the example shown in FIG. 1, wireless links 112 and 132 represent the incoming call received by test device 130, which could include both forward link and reverse link portions. Wireless repeater system 120 receives outgoing call signals from wireless communication network 110 over wireless link 112, and retransmits the outgoing call signals over wireless link 132 for receipt by test device 130. In the example of test device 200 shown in FIG. 2, the incoming call could be received by receiver device 220 over wireless link 256.

Test device 130 determines (304) a signal strength of the received call. In other examples, test device 130 could determine a signal-to-noise ratio of the received call, an error rate, a bit rate, a packet rate, or other metrics. The signal strength, signal-to-noise ratio, or other metric, could be determined by monitoring signals of the call, user communications, overhead communications, a beacon signal, pilot signal, or other communications transferred from wireless communication network 110 over wireless repeater system 120 and detected by test device 130. In the example shown in FIG. 2, receiver device 220 or control processor 230 of test device 200 could determine the signal strength or signal-to-noise ratio.

Test device 130 then processes (305) the number of probes required to establish the call and the signal strength of the received call to determine a gain level for wireless repeater system 120. In the example shown in FIG. 2, the processing could be performed by control processor 230 of test device 200, with the probe information transferred over link 254 from transmitter device 210 and the signal strength information transferred over link 255 from receiver device 220. This gain level could be represented in decibels, watts, volts per meter, or other representations.

The number of probes required to establish a call may be a high number when too much noise or neighboring signals interfere with the wireless communications of test device 130. The interference could have many possible sources, including strong transmissions by other nearby wireless communication devices, transmissions from wireless repeater system 120, or other sources. The distance between test device 130 and wireless repeater system 120 could also contribute to the number of probes required. A high number of probes required to establish a call typically relates to increased power consumption to establish a call, a longer delay to establish a call, or even a failed call. Likewise, a low number of probes required to establish a call typically relates to decreased power consumption to establish a call and a shorter delay to establish a call.

It can be difficult to minimize the number of probes required to establish a call, while still maintaining an adequate signal strength or other metrics of the transmissions of wireless repeater system 120. For example, if too high of a forward link gain level is determined for wireless repeater system 120, test device 130 or user wireless communication device 140 could encounter difficulty when attempting to establish a call with wireless communication network 110 through wireless repeater system 120. A forward link gain level that is too high could cause a mismatch in reverse link power levels used by test device 130 or user wireless communication device 140 to establish a call through wireless repeater system 120, and could lead to a higher number of probes to establish the call. However, if too low of a gain level is determined for wireless repeater system 120, the low gain level could cause test device 130 or user wireless communication device 140 to transmit with too high of a reverse link power level to establish a call through wireless repeater system 120. Wireless repeater system 120 may then retransmit these high power level reverse link communications at an even higher power levels to wireless communication network 110, and increase the noise levels around wireless communication network 110. Thus, too low of a forward link gain could lead to a higher number of probes for other wireless communication devices in and around wireless communication network 110 which are not communicating through wireless repeater system 120, as well as wasted reverse link transmit power of test device 130 or user wireless communication device 140 when communicating through wireless repeater system 120. Therefore, it is advantageous to determine a proper gain level for the number of probes desired to establish an outgoing call.

In some examples, processing the number of probes required to establish the call and the signal strength of the received call to determine the gain level for wireless repeater system 120 includes minimizing the number of probes required to establish the call.

In other examples, processing the number of probes required to establish the call and the signal strength of the received call to determine the gain level for wireless repeater system 120 includes determining the gain level for wireless repeater system 120 where the number of probes required to establish the call becomes between a minimum threshold number and a maximum threshold number. The minimum and maximum threshold numbers could be predetermined based upon the desires of the operator of wireless communication network 110 or wireless repeater system 120, and transferred to test device 130. In other examples, the minimum and maximum threshold numbers could be determined by test device 130 to optimize the number of probes required in light of the signal strength of the received call.

As discussed above, a signal-to-noise ratio or other metric could also be determined for the received call by test device 130. The signal-to-noise ratio or other metric of the received call could be processed to determine the gain level for wireless repeater system 120. This processing could be in addition to, or alternatively from the processing of the signal level and number of probes of other examples.

In some examples, the gain level for wireless repeater system 120 adjusts a transmit gain of wireless repeater system 120 for wireless communications from wireless communication network 110 retransmitted by wireless repeater system 120. The wireless communications could include calls, RF signals, user communications, beacons, configuration information, overhead information, or other wireless communications. This gain level could indicate a forward link gain level for wireless communications retransmitted by wireless repeater system 120 over wireless links 131, 132, and 141. In other examples, the gain level could indicate a reverse link gain level for wireless communications retransmitted to wireless communication network 110 over wireless links 111 and 112.

In further examples, the gain level could also indicate a receive gain level for wireless repeater system 120. Wireless communications received by wireless repeater system 120 could have a gain level applied, so that the received wireless communications are more effectively retransmitted by wireless repeater system 120.

Test device 130 then transfers (306) the gain level to wireless repeater system 120. In this example, test device 130 transfers the gain level over link 133. In the example shown in FIG. 2, control interface 240 of test device 200 could transfer the gain level or other parameters over link 252.

In some examples, links 133 is a wired or optical connection, and uses such communication formats as Ethernet, optical networking, serial communications, IP packets, a proprietary communication format, or other communication formats and protocols. In other examples, transferring the gain level to wireless repeater system 120 includes transferring the gain level to wireless repeater system 120 over a wireless connection. In the example of a wireless connection, link 133 could be a wireless link. Examples of the wireless link could be a wireless fidelity (WiFi) connection, a wireless network connection, a proprietary wireless link format, a wireless phone call, or other wireless links.

In further examples, transferring the gain level to wireless repeater system 120 over a wireless connection includes placing a call to a phone number associated with wireless repeater system 120. Test device 130 could also establish a call through wireless communication network 110 to a phone number associated with wireless repeater 120. Wireless communication network 110 could then route the call to wireless repeater system 120. Wireless repeater system 120 could then include wireless communication equipment to receive and process the call from test device 130. In the example shown in FIG. 1, the additional call could be placed over wireless link 131 through repeater system 120 and retransmitted over wireless link 111, processed by wireless communication network 110 and routed over link 112 to wireless repeater system 120. Link 352 may not be needed in the example of a wireless connection over a call to wireless repeater system 120.

Advantageously, test device 130 could determine and transfer a gain level for optimal wireless communications through wireless repeater system 120. This gain level could be determined periodically and automatically to maintain a desired level of operation for wireless communications between test device 130, or other wireless communication devices, and wireless communication network 110 through wireless repeater system 120. In some examples, test device 130 is located within a building served by wireless repeater system 120, and advantageously can be used to calibrate wireless communications of wireless repeater system 120 for wireless communication devices communicating in the building.

Figure 4:
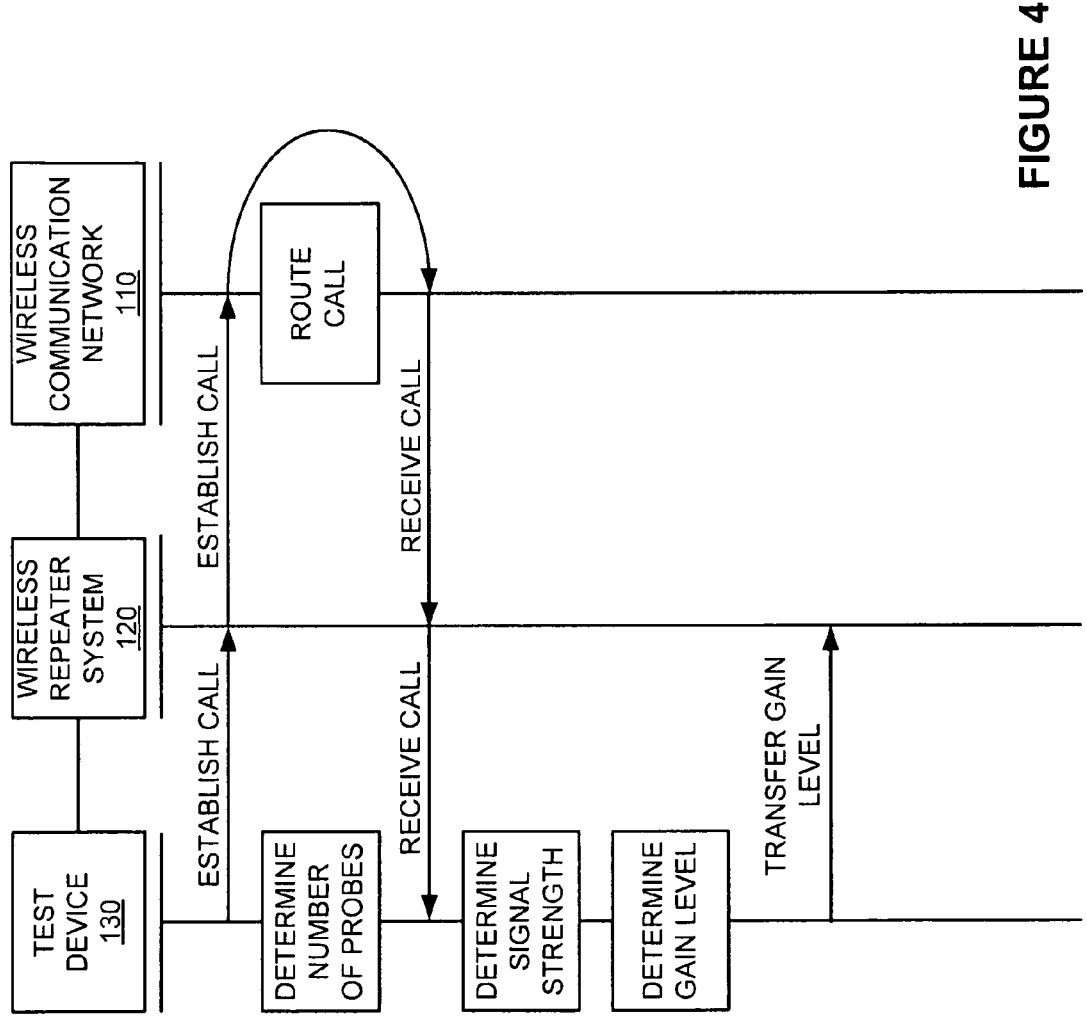
FIG. 4 is a sequence diagram illustrating a method of operation of a test device.

FIG. 4 is a sequence diagram illustrating an example method of operation of test device 130. In FIG. 4, test device 130 establishes an outgoing call through wireless repeater system 120 with wireless communication network 110. Test device 130 establishes the call over wireless link 131, and wireless repeater system 120 retransmits the call signals over wireless link 111 to wireless communication network 110. Test device 130 also determines the number of probes required to establish the outgoing call with wireless communication network 110.

In this example, the outgoing call is placed by test device 130 to test device 130. Test device 130 could have two phone numbers associated with itself, where one phone number is used as the outgoing call number, and the other is used as the incoming call number. In examples where test device 130 has two phone numbers, test device 130 could also contain two wireless communication devices within, or a portion of two wireless communication devices, to place a call and receive a call on different phone numbers. In the example of test device 200 shown in FIG. 2, transmitter device 210 could place the call to receiver device 220 through wireless communication network 110. Also in the example shown in FIG. 2, a different phone number could be associated with each of transmitter device 210 and receiver device 220.

Wireless communication network 110 then routes the call placed by test device 130 to test device 130 over wireless link 112, and wireless repeater system 120 retransmits the call signals over wireless link 132 for receipt by test device 130.

Test device 130 receives the call and determines a signal strength of the received call. Test device 130 could also determine other metrics of the received call, such as a signal-to-noise ratio, or other metrics.

Test device 130 then processes the number of probes required to establish the call with wireless communication network 110 and the signal strength of the call received from wireless communication network 110 to determine a gain level for wireless repeater system 120. In the example of test device 200 of FIG. 2, control processor 230 could determine the gain level.

Test device 130 then transfers the gain level to wireless repeater system 120 over link 133. In the example of test device 200 of FIG. 2, control interface 240 could transfer the gain level to wireless repeater system 120 over link 252.

Figure 5:
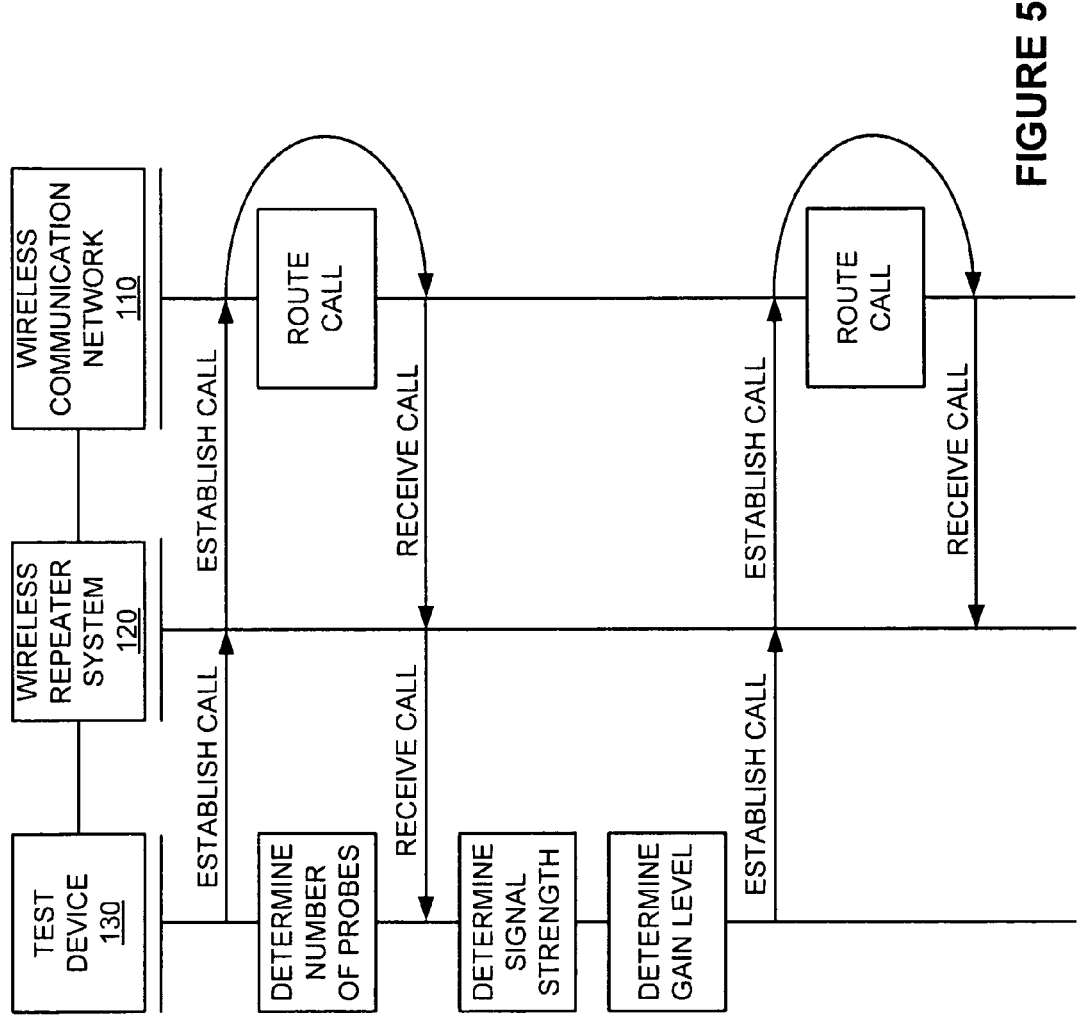
FIG. 5 is a sequence diagram illustrating a method of operation of a test device.

FIG. 5 is a sequence diagram illustrating another example method of operation of test device 130. In FIG. 5, test device 130 establishes an outgoing call through wireless repeater system 120 with wireless communication network 110. Test device 130 establishes the call over wireless link 131, and wireless repeater system 120 retransmits the call signals over wireless link 111 to wireless communication network 110. Test device 130 also determines the number of probes required to establish the outgoing call with wireless communication network 110.

In this example, the outgoing call is placed by test device 130 to test device 130. Test device 130 could have two phone numbers associated with itself, where one phone number is used as the outgoing call number, and the other is used as the incoming call number. In examples where test device 130 has two phone numbers, test device 130 could also contain two wireless communication devices within, or a portion of two wireless communication devices, to place a call and receive a call on different phone numbers. In the example of test device 200 shown in FIG. 2, transmitter device 210 could place the call to receiver device 220 through wireless communication network 110. Also in the example shown in FIG. 2, a different phone number could be associated with each of transmitter device 210 and receiver device 220.

Wireless communication network 110 then routes the call placed by test device 130 to test device 130 over wireless link 112, and wireless repeater system 120 retransmits the call signals over wireless link 132 to test device 130.

Test device 130 receives the call and determines a signal strength of the received call. Test device 130 could also determine other metrics of the received call, such as a signal-to-noise ratio, or other metrics.

Test device 130 then processes the number of probes required to establish the call with wireless communication network 110 and the signal strength of the call received from wireless communication network 110 to determine a gain level for wireless repeater system 120. In the example of test device 200 of FIG. 2, control processor 230 could determine the gain level.

Test device 130 then transfers the gain level to wireless repeater system 120. In this example, transferring the gain level to wireless repeater system 120 includes placing a call to a phone number associated with wireless repeater system 120 through wireless communication network 110. Wireless communication network 110 routes the call to wireless repeater system 120. Wireless repeater system 120 could then include equipment to receive and process the call from test device 130. In the example shown in FIG. 1, the additional call could be placed over wireless link 131 through repeater system 120 and retransmitted over wireless link 111, processed by wireless communication network 110 and routed over link 112 to wireless repeater system 120. In some examples of test device 200 of FIG. 2, control interface 240 places the call to transfer the gain level to wireless repeater system 120 over link 252, while in other examples, transmitter device 210 places the call to transfer the gain level to wireless repeater system 120 over link 251.

Figure 6:
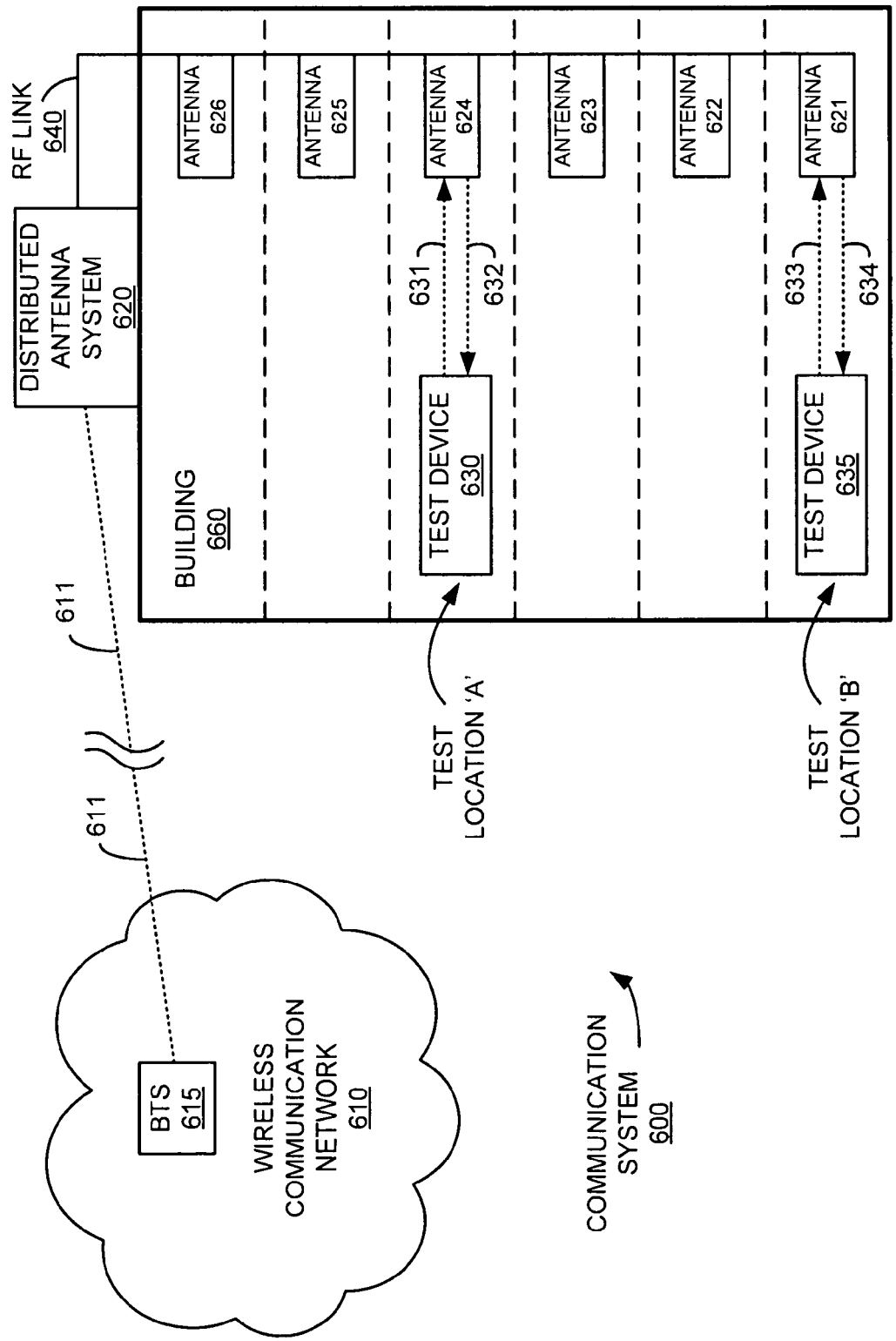
FIG. 6 is a system diagram illustrating a communication system.

FIG. 6 is a system diagram illustrating communication system 600. Communication system 600 includes wireless communication network 610, distributed antenna system 620, antennas 621-626, test devices 630 and 635, and building 660.

Wireless communication network 610 communicates with distributed antenna system 620 through base transceiver station (BTS) 615 over wireless link 611. Distributed antenna system 620 and antennas 621-626 communicate over radio-frequency (RF) link 640. Test device 630, at test location 'A' communicates with antenna 624 over wireless links 631 and 632. Test device 635, at test location 'B' communicates with antenna 621 over wireless links 633 and 634.

Wireless communication network 610 includes base transceiver station (BTS) 615. In some examples, BTS 615 is considered a donor or macro site for distributed antenna system 620. Wireless communication network 610 also could include further base transceiver stations, base stations, base station controllers, radio node controllers (RNC), packet data serving nodes (PDSN), authentication, authorization, and accounting (AAA) equipment, home agents, data centers, mobile switching centers (MSC), call processing equipment, telephone switches, Internet routers, network gateways, as well as other type of communication equipment, including combinations thereof.

Base station transceiver (BTS) 615 includes equipment to exchange wireless communications to and from wireless communication network 610 over wireless link 611. BTS 651 could also include antennas, transceivers, and other equipment for communicating with and controlling test devices 630, 635, or other wireless communication devices.

Distributed antenna system 620 includes equipment to retransmit wireless communications received from wireless link 611 over RF link 640 using antennas 621-626. Distributed antenna system 620 could also include further antennas, amplifiers, control interfaces, buffers, transmitters, receivers, signal processors, or other communication equipment and circuitry. In this example, distributed antenna system 620 has equipment to apply a gain level to the communications retransmitted over RF link 640.

Examples of a distributed antenna system (DAS) typically include communication systems where base transceiver stations or access node equipment are located separately and distant from multiple antenna nodes serving a geographic area. In many of these DAS examples, the base transceiver station equipment desires to communicate over extended distances to separate antennas capable of communicating with wireless communication devices over wireless links.

Antennas 621-626 include antennas and equipment capable of transferring communications between RF link 640 and each respective floor of building 660. In this example, antennas 624 and 621 transfer communications between RF link 640 and test devices 630 and 635 over wireless links 631/632 and 633/634, respectively. Antennas 621-626 may also include further antennas, antenna arrays, filtering equipment, other communications equipment, or combinations thereof.

Test devices 630 and 635, in this example, each include at least two wireless communication devices, where one of the included wireless communication devices could be for outgoing calls, while the other could be for incoming calls. Test devices 630 and 635 could also each include antennas, network interfaces, control interfaces, control processors, or other communication equipment—including combinations thereof. Examples of a control processor in test devices 630 and 635 may include microprocessors, computers, or software such as an operating system, logs, utilities, drivers, networking software, and other software stored on a computer-readable medium.

Building 660 includes six floors, as indicated by the dashed horizontal lines in FIG. 6. Each floor is served by one of antennas 621-626. Also in FIG. 6, building 660 has distributed antenna system 620 located on the top portion, although in other examples distributed antenna system 620 could be located at other locations in or around building 660. As noted above, in this example, test device 630 is located on the fourth floor of building 660 at test location 'A,' while test device 635 is located on the first floor of building 660 at test location 'B.'

Wireless link 611 uses the CDMA communication protocol in this example. In FIG. 6, wireless link 611 represents all wireless communications exchanged through BTS 615 between wireless communication network 610 and distributed antenna system 620, which could include both forward link and reverse link portions. Wireless link 611 is illustrated as cropped in size for clarity in FIG. 6, as BTS 615 of wireless communication network 610 could be located a distance away from building 660.

In the example shown in FIG. 6, RF link 640 is a coaxial wire link between distributed antenna system 620 and antennas 621-626, and RF link 640 carries a retransmitted version of wireless communications received over wireless link 611. Likewise, RF link also carries communications received by each antenna 621-626 for transfer to distributed antenna system 620. RF link 640 could include separate links for each antenna 621-626, or transfer all wireless communications over a single link for all antennas 621-626. Other examples of RF link 640 could include a waveguide to each antenna 621-626.

In further examples, RF link 640 carries an optical version of the wireless communications exchanged with base transceiver station 615 over link 611. In examples where RF link 640 is an RF optical link, distributed antenna system 620 could also include RF-optical converter equipment to convert between the optical format suitable for communications over RF link 640 and the wireless signaling format of wireless link 611. Also, in examples where RF link 640 is an RF optical link, antennas 621-626 could then include equipment to convert between the optical format suitable for communications over RF link 640 and the wireless signaling format of wireless links associated with each antenna 621-626.

Wireless links 631/632 and 633/634 are wireless links using the CDMA communication protocol in this example. Also, in the example found in FIG. 6, wireless links 631 and 633 could be for outgoing calls to wireless communication network 610, while wireless links 632 and 634 could be for incoming calls from wireless communication network 610.

Calls established to and from test devices 630 or 635 through distributed antenna system 620 with wireless communication network 610 could include bi-directional communications. For example, the portions of the bi-directional wireless communications relating to an outgoing call, that are transferred back to test device 630 by wireless communication network 610 over wireless link 611, would also be retransmitted over RF link 640 and wireless link 631. Wireless communications transferred from wireless communication network 610 through distributed antenna system 620 to test device 630, test device 635, or other wireless communication devices, can be referred to as forward link communications. Likewise, wireless communications transferred from test device 630, test device 635, or other wireless communication devices through distributed antenna system 620 to wireless communication network 610 can be referred to as reverse link communications. Wireless links 631-632 and 633-634 may also each comprise many different signals sharing the same link, as discussed regarding wireless links 111, 112, 131, 132, and 141 above.

Figure 7:
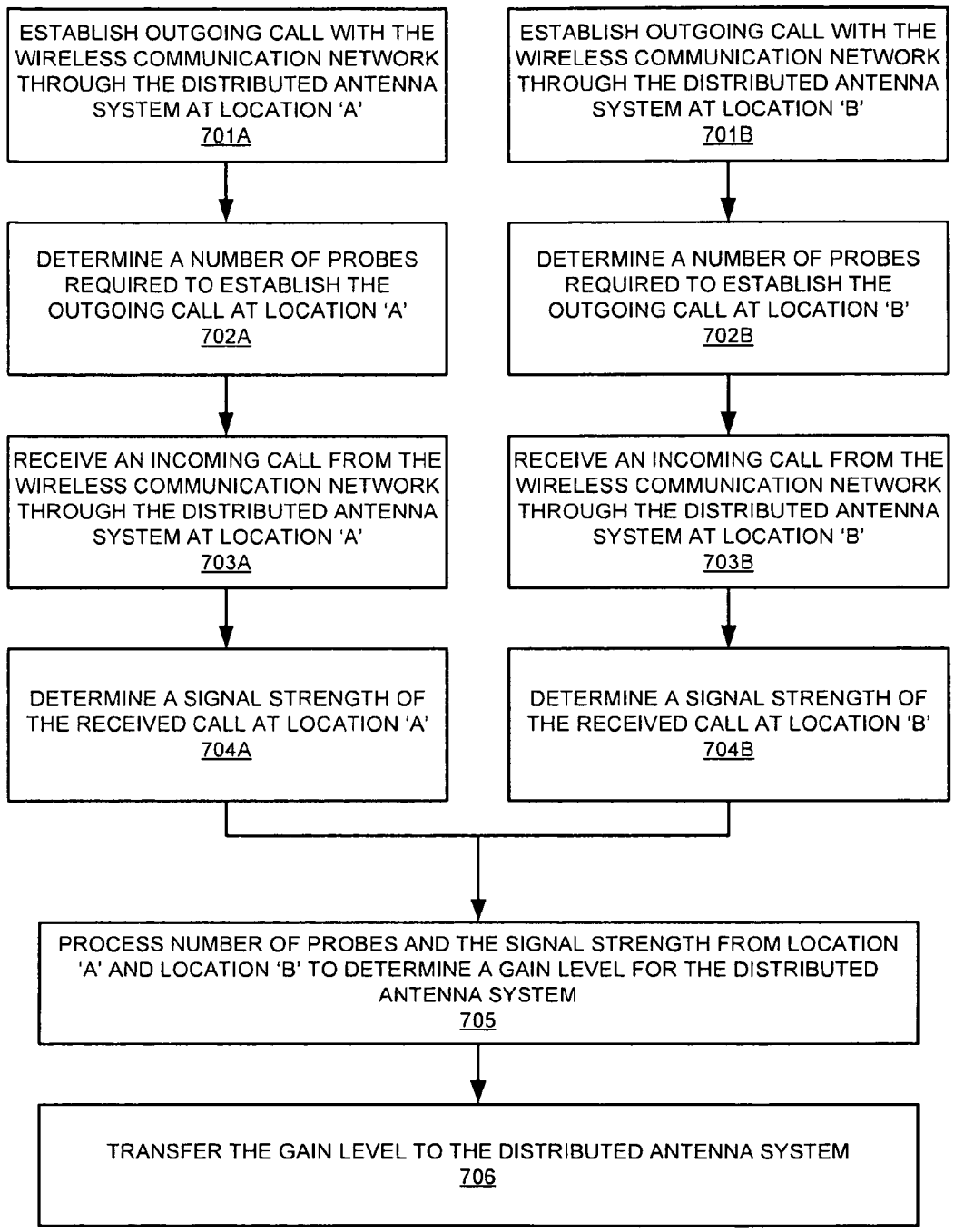
FIG. 7 is a flow diagram illustrating a method of operation of a test device.

FIG. 7 is a flow diagram illustrating a method of operation of test devices 630 and 635, as found in FIG. 6. The operations shown in FIG. 7 are indicated herein parenthetically.

In FIG. 7, test device 630 establishes (701A) an outgoing call with wireless communication 610 through distributed antenna system 620 while at test location 'A.' In the example shown in FIG. 6, wireless link 631, RF link 640, and wireless link 611 represent the outgoing call placed by test device 630. Distributed antenna system 620 receives the outgoing call signals from test device 630 over RF link 640, and retransmits the outgoing call signals over wireless link 611 for receipt by BTS 615 in wireless communication network 610.

In this example, the call established is a data call from a first phone number associated with test device 630 to a second phone number associated with test device 630. The call would be handled through wireless communication network 610. Wireless communication network 610 would then process the incoming call, and route the call to test device 630 back through BTS 615 and wireless link 611. Test device 630 could include two wireless communication devices, or two reduced functionality wireless communication devices, in this example.

Test device 630 determines (702A) a number of probes required to establish the call. When test device 630 attempts to establish a call with wireless communication network 610 through distributed antenna system 620 as in operation 701A, a number of call attempts may be required. In this example, the probes represent communication attempts in a CDMA protocol, which include an increasing probe transmit power level for each subsequent probe.

Test device 630 then receives (703A) the call from wireless communication network 610 through distributed antenna system 620. In the example shown in FIG. 6, wireless link 611, RF link 640, and wireless link 632 represent the incoming call received by test device 630. Distributed antenna system 620 receives outgoing call signals from BTS 615 of wireless communication network 610 over wireless link 611, and retransmits the outgoing call signals over RF link 640 for receipt by test device 630 through antenna 624 and wireless link 632.

In this example, distributed antenna system 620 also applies a gain level to call signals retransmitted for test device 630 over RF link 640. Also in this example, distributed antenna system 620 can receive a gain level from test device 630. The gain level would at least set the signal strength of signals retransmitted over RF link 640 and wireless links 631/634 through antenna 624.

Test device 630 then determines (704A) a signal strength of the received call at test location 'A' in building 660.

Test device 635 establishes (701B) an outgoing call with wireless communication 610 through distributed antenna system 620 while at test location 'B.' In the example shown in FIG. 6, wireless link 633, RF link 640, and wireless link 611 represent the outgoing call placed by test device 635. Distributed antenna system 620 receives the outgoing call signals from test device 635 over RF link 640, and retransmits the outgoing call signals over wireless link 611 for receipt by BTS 615 in wireless communication network 610.

In this example, the call established is a data call from a first phone number associated with test device 635 to a second phone number associated with test device 635. The call would be handled through wireless communication network 610. Wireless communication network 610 would then process the incoming call, and route the call to test device 635 back through BTS 615 and wireless link 611. Test device 635 could be of a similar configuration as test device 630.

Test device 635 determines (702B) a number of probes required to establish the call. When test device 635 attempts to establish a call with wireless communication network 610 through distributed antenna system 620 as in operation 701B, a number of call attempts may be required. In this example, the probes represent communication attempts in a CDMA protocol, which include an increasing probe transmit power level for each subsequent probe.

Test device 635 then receives (703B) the call from wireless communication network 610 through distributed antenna system 620. In the example shown in FIG. 6, wireless link 611, RF link 640, and wireless link 634 represent the incoming call received by test device 635. Distributed antenna system 620 receives outgoing call signals from BTS 615 of wireless communication network 610 over wireless link 611, and retransmits the outgoing call signals over RF link 640 for receipt by test device 635 through antenna 621 and wireless link 634.

In this example, distributed antenna system 620 also applies a gain level to call signals for test device 635 retransmitted over RF link 640. Also in this example, distributed antenna system 620 can receive a gain level from test device 635. The gain level would set the signal strength of forward link signals retransmitted over RF link 640 and wireless links 633/634 through antenna 621.

Test device 635 determines (704B) a signal strength of the received call at test location 'B' in building 660.

Test devices 630 and 635 then each process (705) the number of probes required to establish the call and the signal strength of the received call to determine a gain level for distributed antenna system 620.

The gain levels from each of test device 630 and 635 are transferred (705) to distributed antenna system 620. In examples where RF link 640 has a separate link for each antenna 621-626, the gain level could indicate a retransmit signal strength for the respective link serving the antenna associated with the test location or floor in building 660. In examples where RF link 640 uses a single link to carry all communications received over wireless link 611, the two gain levels could be further processed by distributed antenna system 620 to determine an aggregate gain level to best serve wireless communication devices at multiple locations. In further examples, test devices 630 and test device 635 could exchange communications to determine a single gain level to transfer to distributed antenna system 620.

It should be noted that although two test devices, 630 and 635, are illustrated in FIG. 6 and discussed regarding FIG. 7, a single test device moved between different locations, such as test location 'A' to test location 'B,' could also be used to determine a gain level as discussed herein. The gain level for one location associated with building 660 could be processed along with gain levels from other locations associated with building 660 to determine a gain level for transfer to distributed antenna system 620.

FIGS. 1-7 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A test device for a wireless repeater system in a wireless communication network, comprising:
  a transmitter configured to establish a call with the wireless communication network through the wireless repeater system and determine a number of probes required to establish the call;
  a receiver configured to receive the call from the wireless communication network through the wireless repeater system and determine a signal strength of the received call;
  a control processor coupled to the transmitter and the receiver configured to process the number of probes required to establish the call and the signal strength of the received call to determine a gain level for the wireless repeater system;
  a control interface coupled to the control processor and configured to transfer the gain level to the wireless repeater system to optimize a gain level of the wireless communication.

2. The test device of claim 1, wherein the call is a voice call to a phone number associated with the receiver, and wherein the received call from the wireless communication network through the wireless repeater system is the voice call.

3. The test device of claim 1, wherein the call is a data call to a phone number associated with the receiver, and wherein the received call from the wireless communication network through the wireless repeater system is the data call.

4. The test device of claim 1, wherein the gain level for the wireless repeater system adjusts a transmit gain of the wireless repeater system for the wireless communications from the wireless communication network through the wireless repeater system.

5. The test device of claim 1, wherein the control processor is configured to minimize the number of probes required to establish the call to determine the gain level for the wireless repeater system.

6. The test device of claim 1, wherein the control processor is configured to determine the gain level for the wireless repeater system where the number of probes required to establish the call is between a minimum threshold number and a maximum threshold number.

7. The test device of claim 1, comprising:
the receiver configured to determine a signal-to-noise ratio of the received call;
the control processor configured to process the number of probes required to establish the call, the signal strength of the received call, and the signal-to-noise ratio of the received call to determine the gain level for the wireless repeater system.

8. The test device of claim 1, wherein the control interface is configured to transfer the gain level to the wireless repeater system over a wireless connection.

9. The test device of claim 8, wherein the wireless connection is a second call placed by the transmitter to a second phone number associated with the wireless repeater system.

10. The test device of claim 1, comprising:
the transmitter configured to establish another call with the wireless communication network through the wireless repeater system and determine another number of probes required to establish the other call, wherein the other call is placed at a different location than the call;
the receiver configured to receive the other call from the wireless communication network through the wireless repeater system and determine another signal strength of the received other call;
the control processor configured to process the number of probes required to establish the call, the other number of probes to establish the other call, the signal strength of the received call, and the other signal strength of the other call to determine the gain level for the wireless repeater system;
the control interface configured to transfer the gain level to the wireless repeater system.

11. A method of operating a test device for a wireless repeater system in a wireless communication network, the method comprising:
establishing a call with the wireless communication network through the wireless repeater system and determining a number of probes required to establish the call using a transmitter;
receiving the call from the wireless communication network through the wireless repeater system and determining a signal strength of the received call using a transmitter;
processing the number of probes required to establish the call and the signal strength of the received call to determine a gain level for the wireless repeater system using a control processor coupled to the transmitter and receiver;
transferring the gain level to the wireless repeater system to optimize a gain level of the wireless communication network using the control interface coupled to the control processor.

12. The method of claim 11, wherein establishing the call with the wireless communication network through the wireless repeater system comprises placing a voice call to a phone number associated with the test device, and wherein the received call from the wireless communication network through the wireless repeater system is the voice call.

13. The method of claim 11, wherein establishing the call with the wireless communication network through the wireless repeater system comprises placing a data call to a phone number associated with the test device, and wherein the received call from the wireless communication network through the wireless repeater system is the data call.

14. The method of claim 11, wherein the gain level for the wireless repeater system adjusts a transmit gain of the wireless repeater system for the wireless communications from the wireless communication network through the wireless repeater system.

15. The method of claim 11, wherein processing the number of probes required to establish the call and the signal strength of the received call to determine the gain level for the wireless repeater system comprises minimizing the number of probes required to establish the call.

16. The method of claim 11, wherein processing the number of probes required to establish the call and the signal strength of the received call to determine the gain level for the wireless repeater system comprises determining the gain level for the wireless repeater system where the number of probes required to establish the call is between a minimum threshold number and a maximum threshold number.

17. The method of claim 11, comprising:
determining a signal-to-noise ratio of the received call; and
further comprising:
processing the signal-to-noise ratio of the received call to determine the gain level for the wireless repeater system.

18. The method of claim 11, wherein transferring the gain level to the wireless repeater system comprises transferring the gain level to the wireless repeater system over a wireless connection.

19. The method of claim 18, wherein transferring the gain level to the wireless repeater system over the wireless connection comprises placing a second call to a second phone number associated with the wireless repeater system.

20. The method of claim 11, further comprising:
establishing another call with the wireless communication network through the wireless repeater system and determining another number of probes required to establish the other call, wherein the other call is placed at a different location than the call;
receiving the other call from the wireless communication network through the wireless repeater system and determining another signal strength of the received other call;
processing the number of probes required to establish the call, the other number of probes to establish the other call, the signal strength of the received call, and the other signal strength of the other call to determine the gain level for the wireless repeater system;
transferring the gain level to the wireless repeater system.

* * * * *